United States Patent [19]
Dransfield

[11] 4,102,429
[45] Jul. 25, 1978

[54] APPARATUS FOR GENERATING SEISMIC WAVES

[75] Inventor: Clifford D. Dransfield, Dallas, Tex.

[73] Assignee: Atlantic Richfield Company, Los Angeles, Calif.

[21] Appl. No.: 740,645

[22] Filed: Nov. 10, 1976

[51] Int. Cl.² .......................... G01V 1/04; G01V 1/06
[52] U.S. Cl. .................................... 181/117; 181/114
[58] Field of Search ............... 181/114, 117, 113, 119, 181/116, 118; 173/125; 404/133 (U.S. only); 308/4 R

[56] References Cited
U.S. PATENT DOCUMENTS

| | | | |
|---|---|---|---|
| 3,198,282 | 8/1965 | Dunaway | 181/117 |
| 3,349,867 | 10/1967 | Mounce | 181/119 |
| 3,810,524 | 5/1974 | Dransfield | 181/117 |

Primary Examiner—Maynard R. Wilbur
Assistant Examiner—Lawrence Goodwin
Attorney, Agent, or Firm—Robert M. Betz

[57] ABSTRACT

A seismic wave generator assembly with self-contained guidance and shock-absorbing means is confined within an elongated, upstanding cylindrical housing which may be lowered into position at the end of a lateral arm or a cable supported from a transport vehicle.

8 Claims, 2 Drawing Figures

APPARATUS FOR GENERATING SEISMIC WAVES

BACKGROUND OF THE INVENTION

1. Field of the Invention.

This invention relates to improvements in apparatus for seismic exploration, and more particularly to improvements in apparatus for generating seismic waves.

2. Description of the Prior Art

The invention preferably employs a seismic wave generator of the gas exploder type described in U.S. Pat. No. 3,958,661 to Dransfield. In this patent an elongated upstanding cylindrical housing contains a movable piston element disposed above an expansible combustion chamber and below a downwardly biasing gas compression chamber. Ignition of a combustible gas mixture in the combustion chamber drives the housing downwardly to impart a seismic pulse to the earth and drives the piston upwardly in reaction. The housing is then drawn upwardly responsive to the increasing pressure within the compression chamber and to the reaction of the earth itself. A prior art apparatus for carrying such a generator is disclosed in U.S. Pat. No. 3,810,524 to Dransfield. According to this patent, the previously described piston is connected to a "catcher" which, upon firing of the device, controls the movement of the generator until it returns to an initial rest position. The upward recoil of the generator is guided by means of roller, gear type, or sliding contact between a piston rod extending upwardly from the piston and an external framework. The piston rod also interconnects the generator, by means of a yoke, with the dashpot pistons of a pair of fixed fluid-filled dashpot cylinders. After the generator reaches its maximum height, these cylinders return it slowly to its initial firing position.

As emphasized in the above-referenced patents, a lightweight seismic gas exploder of elongated tubular construction possesses significantly advantages. Truck transport is simplified and deployment is facilitated particularly in muddy or marshy environments. However, it is apparent that the external framework described above by means of which the recoil and return of such a generator is guided and controlled takes up considerable space in addition to that occupied by the generator itself, whether freestanding or truck mounted. Therefore, to enhance the maneuverability of the device, the present invention eliminates this framework, while at the same time preserving the elongated shape and silhouette of the generator.

It is conventional to perform the damping functions of the dual hydraulic cylinders discussed above by means of a single, upstanding cylinder mounted directly above and interconnected with the movable piston of a seismic gas exploder. The invention to be described utilizes such a combination in an apparatus designed to meet the objectives set forth herein.

SUMMARY OF THE INVENTION

It is therefore a general object of this invention to provide a seismic gas exploder wherein the guidance and control features are substantially self-contained.

It is another object of this invention to provide seismic generator apparatus which is well adapted to deployment in muddy or marshy environments.

The invention broadly presents a seismic wave generator apparatus which is enclosed within an upstanding cylindrical housing of substantially uniform diameter. The lower portion of the generator housing consists of an enclosed impact cylinder forming a sealed compartment and adapted to rest on or remain supported above a solid earth surface. An expansible combustion chamber is formed in this compartment by the space beneath a movable generator piston which is biased downwardly by gas pressure. The upper portion of the generator housing consists of a sleeve into whose open top a fluid-filled dashpot housing projects downwardly in telescoping fashion. A dashpot piston is disposed within the dashpot housing and interconnects with the generator piston by means of a common piston rod whose upper end extends freely through the top of the dashpot housing so that the fluid volume in the dashpot chamber remains constant with motion of the dashpot piston in either direction. The dashpot piston is provided with relatively large longitudinal holes through which fluid passes downwardly with upward piston movement. When the dashpot piston is moving downward, however, the holes are blocked and a metered fluid bypass is provided through a longitudinal bore in the piston rod.

In use the dashpot housing is supported independently of the generator housing as from one end of a cantilevered arm extending off the side of a truck body. Responsive to a gas explosion within the expanding combustion chamber, the impact cylinder is first driven downwardly to impart a seismic impulse and then is drawn upwardly with the generator and dashpot pistons. This causes the attached sleeve to be guided longitudinally upward along the external surface of the dashpot housing while the piston rod is itself guided through sleeve bearings at both ends of the dashpot housing. The only substantial upward force on the independent support means for the dashpot housing is that transmitted through the fluid resistance to the upward movement of the dashpot piston. After the reactive forces are spent, the apparatus returns to a rest position at a controlled rate through hydraulic damping. The dashpot housing may be pivotally attached to its independent support such as the above-referenced cantilevered arm, which in turn may be raised or lowered in order to effect deployment.

BRIEF DESCRIPTION OF THE DRAWINGS

The invention is illustrated in the accompanying drawings wherein.

DESCRIPTION OF THE PREFERRED EMBODIMENTS

Figure 2:
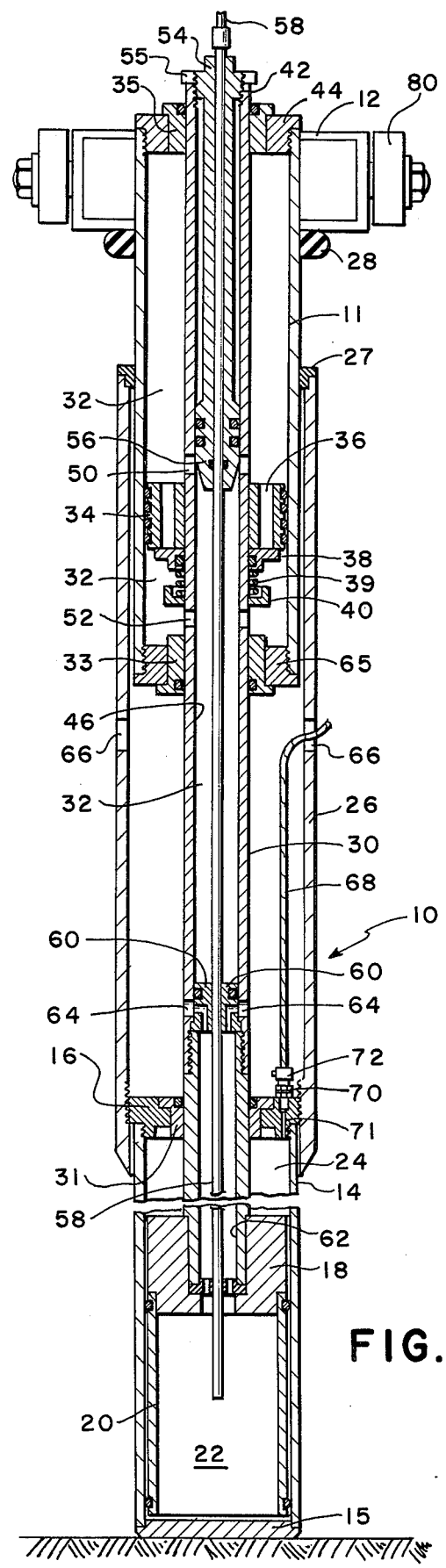
FIG. 2 is a vertical cross section through the seismic wave generating apparatus of FIG. 1.
Figure 1:
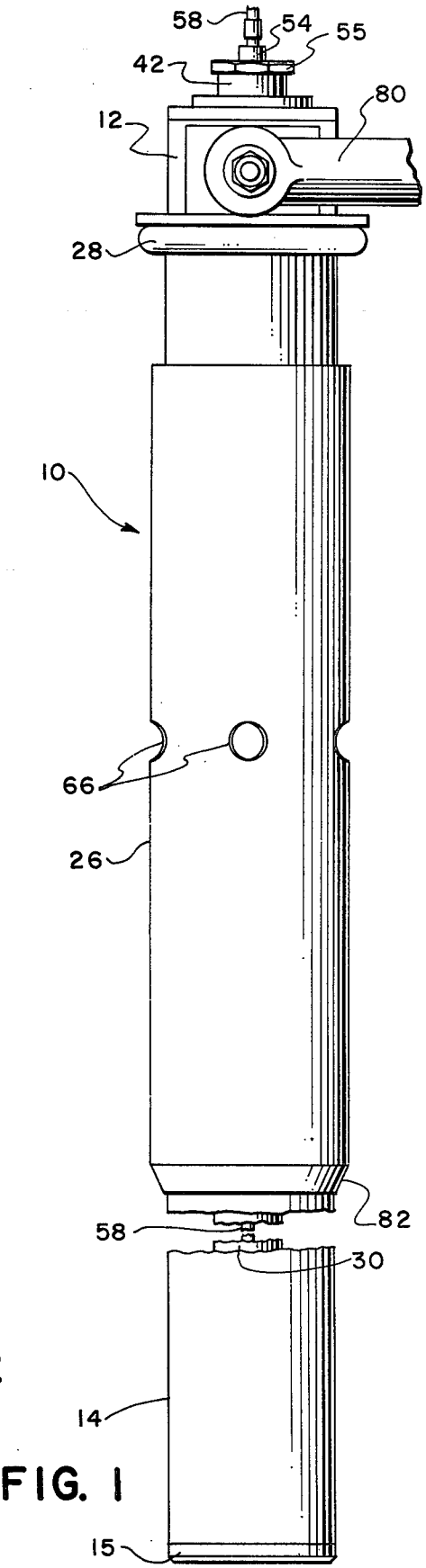
FIG. 1 is a side-elevation view of the seismic wave generating apparatus in accordance with the invention.

The seismic wave generator in accordance with the preferred embodiment of the invention, illustrated in FIGS. 1 and 2, includes an upstanding cylindrical generator housing 10 which is penetrated at the top by a dashpot housing 11 dependently attached to a pivot frame 12 suitably supported above the earth as from a truck body (not shown).

The lower portion of the generator housing 10 consists of an impact cylinder 14 enclosed at the bottom with an impact plate 15 and at the top with an end cover 16. A generator piston 18 is movable within the sealed compartment thereby formed within the impact cylinder 14. The bottom of the generator piston 18 may be provided with a cylindrical extension 20 which in its lowermost position is in close proximity with the impact plate 15 and defines an expansible combustion chamber 22. Appropriate metal sealing rings establish a gas tight fit between generator piston 18, extension 20, and the inner wall of the impact cylinder 14. The space within the cylinder 14 above the generator piston 18 forms a compression chamber 24 which is adapted to be filled with nitrogen or other inert gas at two or three atmospheres of pressure.

An open-ended cylindrical sleeve 26 is threaded onto the end cover 16 so that it forms a fixed upper portion of the generator housing 10. The sleeve 26 projects upwardly to surround and slidably contact a substantial lower portion of the external surface of the dashpot housing 11 through the circular bushing 27. In the rest position of the generator housing 10, the bushing 27 is spaced a predetermined distance below the rubber bumper 28 secured to the undersurface of the frame 12. This spacing is selected so that in normal operation the relative movement of the sleeve 26 and the dashpot housing 11 is insufficient to cause contact with the bumper 28, which is therefore a safety feature only. Carrying the generator piston 18 and extending therefrom between the impact cylinder 14 and the dashpot housing 11 is a hollow piston rod 30 supported slidably within sleeve bearings 31, 33 and 35. The dashpot housing 11 is filled with hydraulic fluid 32 above and below a dashpot piston 34 which is also carried on and fixed to the piston rod 30. The dashpot piston 34 is provided with a plurality of longitudinal holes 36 normally closed at the bottom by a valve plate 38 which is urged upwardly by a spring 39 supported within fixed collar 40. The permissible passage of fluid 32 through the body of the dashpot piston 34 is therefore substantially unidirectional, i.e., in a downward direction. Due to the fact that the upper free end 42 of the piston rod 30 extends through the sealed upper cover 44 of the dashpot housing 11, any upward movement of the dashpot piston 34 displaces equal quantities of fluid 32 on either side of such piston. Thus, in that event no bypass or separate reservoir is required. However, when the dashpot piston 34 is moving downwardly with respect to the housing 11, the holes 36 are blocked. A fluid bypass is therefore established through an upper fluid-filled bore portion 46 within the piston rod 30 which communicates with the fluid 32 above and below the dashpot piston 34 by means of upper holes 50 and lower holes 52 respectively. In order to control the bypass rate, an adjustable plunger 54 is threaded into the upper end 42 of the piston rod 30 secured in a desired position by a lock nut 55, so that its lower tip 56 effectively closes the hole 50 to any desired degree. Fluid will continue to flow through the bypass until holes 52 enter the sleeve bearing 33. Sufficient distance should be allowed between the bottom of the collar 40 and the top of holes 52 to insure that the collar 40 does not undesirably impact the sleeve bearing 33. Also in the bottommost position of piston 34, the sleeve 20 must not be able to make damaging contact with impact plate 15.

In a manner more particularly described in U.S. Pat. No. 3,958,661, a combustible gas mixture may be introduced within the combustion chamber 22 by means of a fuel conducting tube 58 extending centrally through the longitudinal bore of the piston rod 30. An intermediate plug 60 separates the upper fluid-filled bore portion 46 of the rod 30 from a lower bore portion 62 which is in communication with the combustion chamber 22. The annulus within the bore portion 62 surrounding the fuel conducting tube 58 provides a gas flow path. Spent gases exiting from the chamber 22 flow through the bore portion 62 and exit through holes 64 into the interior of the sleeve 26 between end cover 16 and the lower cover 65 of the dashpot housing 11. These trapped gases are finally released to the atmosphere through peripheral ports 66 in the wall of the sleeve 26 at some distance above the exhaust holes 64. Obviously, the vertical clearance between ports 66 and the bottom of cover 65 must be at least equal to the clearance between the bushing 27 and the bumper 28.

An inert gas such as nitrogen is introduced into the compression chamber 24 through a flexible tube 68, one end of which can conveniently be inserted through one of the ports 66 and the other end terminated in a hose fitting 70 positioned over an orifice 71 in the end cover 16. As a safety factor, the tube 68 is provided above the hose fitting 70 with a pressure bleed valve 72. This insures that inert gas will neutralize any unexploded gas mixture which may find its way into the interior of the sleeve 26.

The device may be conveniently deployed by supporting the frame 12 at a desired distance above the earth. This may be accomplished in a number of ways. For example, the frame 12 can be attached to a yoke 80 constituting the free end of a cantilevered arm (not shown) supported off the side or the end of a truck body. Alternatively, it may be suspended at the end of a cable (not shown) carried by a truck supported pulley arrangement. The device may thus be oriented in an upright position so that the impact plate 15 either rests on the surface of the earth or is positioned above it. Since the compression chamber 24 biases the generator piston 18 toward the bottom of the impact cylinder 14, the relative positions of the dashpot housing 11 and the sleeve 26 are maintained regardless of whether or not the impact plate 15 is in contact with the earth. In the unlikely event that air pressure is lost within the compression chamber 24, the apparatus is so dimensioned that the sleeve 26 can never slide completely free of the lower cover 65 of the housing 11.

In operation when combustible gas mixture is introduced within the combustion chamber 22 through the fuel conducting tube 58 and ignited in a manner well known in the art, the generator piston 18, the dashpot piston 34 and the piston rod 30 are all urged upwardly as a unit while the entire generator housing 10 is urged in a downwardly direction to produce the desired seismic shock wave. Fluid 32 transfers through the dashpot piston 34 with relative freedom, and the only shock transmitted to the frame 12 is due to whatever fluid resistance there is to this motion. The fact that the piston rod 30 projects through the top of the housing 11 aids in maintaining alignment at all times between the housing 10 and other portions of the apparatus.

The upward reactive force on the impact plate 15 coupled with the compressive forces within the chamber 24 pull the entire generator housing 10 upwardly causing the sleeve 26 at the same time to slide upwardly along the external surface of the dashpot housing 11. The external surface in effect constitutes a guide for the entire inner cylindrical surface of the sleeve 26 and thus further steadies the entire generator housing 10. When the reactive force is spent, gravity will again urge the piston rod 30 with its two pistons 18 and 34 in a downward direction. By this time, the gas pressure within the chamber 24 will have already urged the generator piston 18 toward the bottom of the impact cylinder 14. Thus, the damped downward motion of the dashpot piston 34 in effect determines the rate of descent of the generator housing 10 until the impact plate 15 again contacts the earth's surface or reaches its original rest position.

Since the guidance and catching features of this device are contained within the generator housing 10, the device may be readily supported at varying distances off the side or the end of the bed of a transporting vehicle. Those skilled in this art will have no difficulty in devising cantilevered or pantographic arm constructions flexible or cable arrangements appropriate to perform this job.

The generator housing 10 may conveniently be built with a maximum outer diameter of anywhere from seven to ten inches and a length of five feet or more. With the aid of a pivoted support, very little vertical movement of the yoke 80 is required to shift from a transparent to a firing position. If desired, however, the apparatus may be developed in marshy or muddy environments by pushing or allowing the generator housing 10 to sink into a partially submerged position. The depth to which housing may be submerged is limited only by insuring clearance above the surface for the exhaust ports 66. The outer diameter of the sleeve 26 is slightly larger than that of the lower impact cylinder 14, the surfaces being interconnected by means of the chamfered surface portion 82. This difference in diameters will help to decrease the suction effect beneath the impact plate 15 when the gun is removed.

Although the invention has been described and illustrated with a certain degree of particularity, it is understood that the present disclosure is made by way of example only and that numerous changes in the details of construction and the combination and arrangement of parts may be resorted to without departing from the spirit and scope of the invention as hereinafter claimed.

The embodiments of the invention in which an exclusive property or privilege is claimed are defined as follows.

1. A seismic wave generator system comprising:
   (a) a support frame,
   (b) a dashpot including a cylindrical fluid-filled dashpot housing dependently attached to said frame having a dashpot piston therein,
   (c) an upstanding enclosed cylindrical impact housing positioned beneath and in axial alignment with said dashpot housing,
   (d) a cylindrical sleeve rigidly fixed to the top of said impact housing and extending therefrom into slidable telescoping engagement with the external surface of said dashpot housing,
   (e) a generator piston movable within said impact housing and adapted to form with the sides and bottom thereof an expansible combustion chamber,
   (f) means within said impact housing above said generator piston for biasing said generator piston toward the bottom of said impact housing,
   (g) a piston rod extending between said impact housing and said dashpot housing on which said dashpot and generator pistons are carried, and
   (h) means for initiating a gas explosion within said combustion chamber to drive said impact housing downwardly and said generator and dashpot pistons upwardly, said sleeve being thereafter guided upwardly along said external dashpot housing surface, the motion of said impact being damped by said dashpot.

2. Apparatus as in claim 1 wherein the only substantial upward force on said frame is transmitted thereto through the fluid in said dashpot housing.

3. Apparatus as in claim 1 wherein said piston rod extends freely through the top of said dashpot housing and contains a longitudinal bore and additionally comprising:
   (a) means for permitting fluid flow through said dashpot piston in a downward direction and
   (b) bypass means for returning said fluid through an upper, fluid-filled portion of said bore of said piston rod to above said dashpot piston.

4. Apparatus as in claim 3 wherein the wall of said piston rod above and below said dashpot piston is penetrated by upper and lower holes respectively communicating between said upper fluid-filled bore portion and the fluid in said dashpot housing.

5. Apparatus as in claim 4 additionally including externally positionable plunger means extending downwardly within said upper portion of said bore to control the fluid flow through said upper holes.

6. Apparatus as in claim 3 wherein a lower portion of said longitudinal bore in said piston rod separated from said upper fluid-filled portion of said bore communicates with said combustion chamber and wherein the wall of said piston rod is further provided with outlet ports communicating between said lower portion and the interior of said sleeve beneath said dashpot housing for conducting exhaust gases away from said combustion chamber.

7. In an apparatus for controlling the movement of a seismic wave generator of the type adapted to impart a seismic pulse to the earth and thereafter rebound upwardly, the improvement comprising:
   (a) a support frame suspended above the earth;
   (b) an upstanding, cylindrical guide member dependently attached to said support frame;
   (c) an upstanding seismic generator cylinder positioned beneath said guide member in axial alignment therewith;
   (d) a cylindrical sleeve fixed to the top of the generator cylinder and extending upwardly therefrom so as to engage the external surface of said guide member for a limited, slidable, telescoping movement therebetween, the diameter of said sleeve being substantially equal to that of said generator cylinder; and
   (e) dashpot means within said guide member operably interconnected with said generator cylinder and adapted to hydraulically damp the movement thereof.

8. Apparatus as in claim 7 additionally comprising:
   (a) a stable platform,
   (b) arm means secured at one end to said platform and extending laterally therefrom, and
   (c) a yoke attached to the opposite end of said arm means to which said support frame is pivotally affixed to enable rotation about a horizontal axis.

* * * * *

UNITED STATES PATENT OFFICE
CERTIFICATE OF CORRECTION

PATENT NO. : 4,102,429
DATED : July 25, 1978
INVENTOR(S) : Clifford D. Dransfield It is certified that error appears in the above-identified patent and that said Letters Patent are hereby corrected as shown below:

Col. 5, Line 17, the word "transparent" should read --transport--.

Col. 5, Line 18, the word "developed" should read --deployed--.

Col. 6, Line 2, "impact being" should read --impact housing being--.

Signed and Sealed this

Twenty-seventh Day of February 1979

[SEAL]

Attest:

RUTH C. MASON
Attesting Officer

DONALD W. BANNER
Commissioner of Patents and Trademarks